United States Patent

Roberts

[15] 3,643,849

[45] Feb. 22, 1972

[54] TAPE GUIDE

[72] Inventor: Clyde D. Roberts, Sapulpa, Okla.

[73] Assignee: Midwestern Instruments, Inc., Tulsa, Okla.

[22] Filed: Feb. 25, 1970

[21] Appl. No.: 13,953

[52] U.S. Cl. ....................226/199
[51] Int. Cl. ....................B65h 23/32
[58] Field of Search ....................226/198, 199; 242/76

[56] References Cited

UNITED STATES PATENTS 3,443,273 5/1969 Arch ....................226/198 X
3,347,437 10/1967 Rush ....................226/198
3,276,651 10/1966 Bryer ....................226/198 X

*Primary Examiner*—Richard A. Schacher
*Assistant Examiner*—Gene A. Church
*Attorney*—Head & Johnson

[57] ABSTRACT

This invention relates to a tape guide for guiding a magnetic tape and includes means of aligning the tape by applying slight continuous pressure to one edge so that the other edge contacts at all times a fixed edge member, the means for urging the tape including a movable edge member displaceable in a direction towards the fixed edge member and including resilient means urging the movable edge member towards the fixed edge member.

4 Claims, 6 Drawing Figures

INVENTOR.
CLYDE D. ROBERTS

BY
Head & Johnson

ATTORNEYS

INVENTOR.
CLYDE D. ROBERTS
BY *Head & Johnson*
ATTORNEYS

TAPE GUIDE

BACKGROUND AND OBJECTS OF THE INVENTION

In magnetic tape recording and reproduction apparatus it is important that the tape track precisely in order that the playback faithfully reproduces the signals recorded on the tape. This is particularly true in digital magnetic memory units wherein a plurality of parallel channels are recorded simultaneously on the tape. A standard tape width presently used in the computer industry in the United States (referred to as ½ inch magnetic tape) has a width of 0.498 inches plus or minus 0.002 of an inch. Thus, ½ inch magnetic tape may vary in width by 0.004 of an inch and still be within the tolerance specifications accepted by the industry. A typical industrial standard includes the use of nine channels on such ½ inch width magnetic tape. Thus the channels must be closely spaced. Any deviation in alignment of the tape as it passes over a playback head, compared to passing over a recorder head, results in signal errors which can lead to inaccurate reproductions and false signal outputs. For instance, magnetic tape traveling at a speed of 100 inches per second having a tape guide deviation of 0.0001 of an inch will result in time variation of as much as 1 microsecond disparted between the inner and outer channels.

In addition to the importance of maintaining an accurate alignment of magnetic tapes it is also important that the reference edge member, and the means for urging the tape in continuous contact with the reference edge member, be arranged such that no shifting occurs when the direction of the travel of tape is reversed. Some tape guide apparatus presently in use include an arrangement wherein edge members are free to shift slightly in the direction of movement of the tape. The continuous wear of tape against an edge member, regardless of how wear resistant the material of edge member may be, inevitably ultimately results in small grooves being formed by the attrition caused by the passage of the tape edge. Such grooves are not necessarily detrimental to the effect of functioning of tape edge members unless shifting of the edge members occurs when the direction of movement of the tape changes in which case the grooves tend to distort or bind the tape and, if the tape is caused to move alternately between grooves which have been formed in edge members the tape can be damaged.

It is therefore an object of this invention to provide an improved guide for magnetic tapes.

More particularly, an object of this invention is to provide a guide for magnetic tapes as used in digital magnetic memory units including improved means for urging the tape against a fixed edge member.

Another object of this invention is to provide a tape guide for use in digital magnetic memory devices including a fixed edge member and a movable edge member having resilient means urging the movable member towards the fixed member, and including improved means resisting deflection of the movable edge member in the direction of travel of the tape.

These are some of the objects of the invention and other objects will be discerned by reading the specification and claims, taken in conjunction with the attached drawings.

DESCRIPTION OF VIEWS

Figure 2:
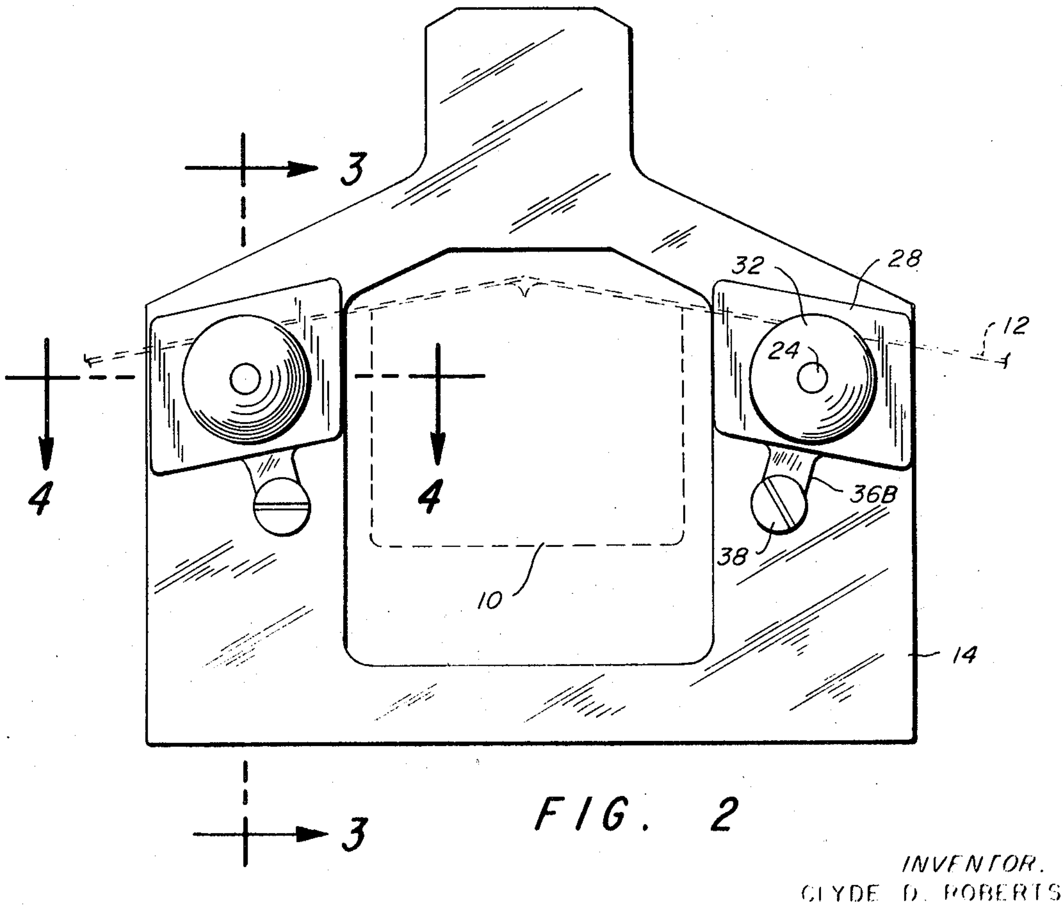
FIG. 2 is a front view of the embodiment of FIG. 1.
Figures 3, 5:
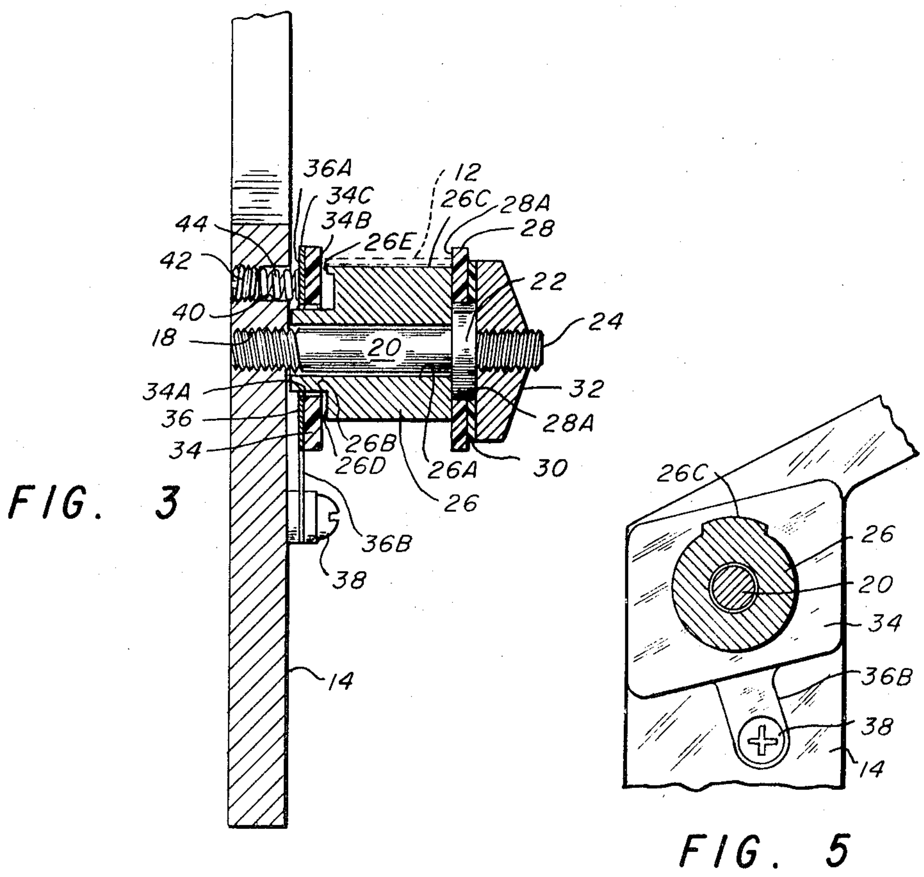
Figure 4:
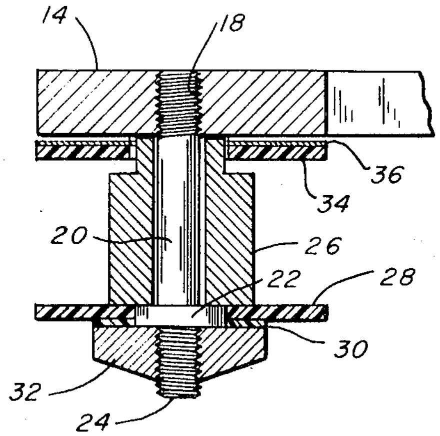

FIGS. 3 and 4 are cross-sectional views taken along the lines 3—3 and 4—4 respectively of FIG. 2.

Figure 1:
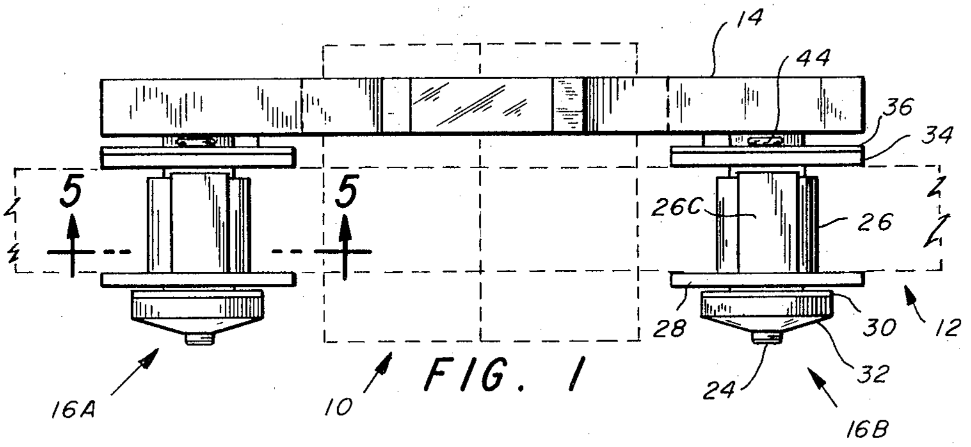
FIG. 1 is a top view of an embodiment of the tape guide of this invention with the tape and the magnetic head over which the tape is guided shown in dotted outline.

FIG. 5 is a cross-sectional view taken along the line 5—5 of FIG. 1.

Figure 6:
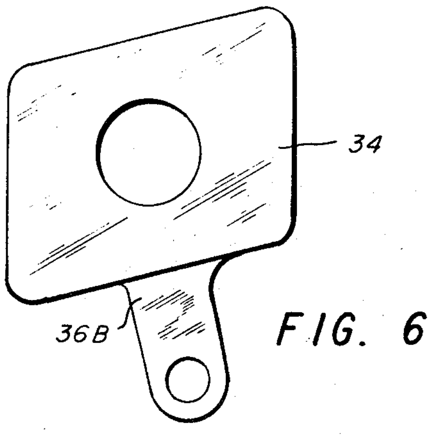

FIG. 6 is an enlarged front view of the movable edge member of the tape guide.

DETAILED DESCRIPTION

Referring now to the drawings, an operable embodiment of the invention is shown. A recording and/or playback head is generally indicated by numeral 10 and is shown in dotted outlines since such is not a direct part of the invention. The invention is a device which serves to align and direct a magnetic tape, shown in dotted outline and generally indicated by the numeral 12, over the magnetic head 10 so that the tape tracks precisely. As previously stated, the width of tape 12 may vary within industrial standards and this invention provides means of aligning the tape relative to a fixed edge member so that the tape passes in alignment over head 10 in either direction of movement and regardless of such varying tape widths.

The tape guide is shown supporting to a baseplate 14 which may also receive and support the tape head 10.

FIGS. 1 and 2 show typical arrangements utilizing two tape guides generally indicated by the numerals 16A and 16B, the tape guide being nearly identical and being spaced one on each side of magnetic head 10.

A threaded opening 18 (see FIG. 3) in baseplate 14 receives a threaded stud 20 having an integral shoulder portion 22 and an outer threaded end 24. A guide block 26, which is generally cylindrical, has a longitudinal opening 26A therein receiving stud 20. The guide block 26 includes a reduced diameter integral shoulder portion 26B, the inner end of which engages baseplate 14. Thus the guide block 26 is held in nonrotated position between baseplate 14 and the stud shoulder portion 22.

Received about the shoulder portion 22 and contiguous to the outer end of guide block 26, is a planar fixed edge member 28 held in position by means of a washer 30 and a nut 32 threaded onto the stud-threaded end 24. The fixed edge member 28 provides a reference surface 28A against which one edge of tape 12 continuously engages. Fixed edge member 28 is preferably formed of some hard, wear-resistant substance, an example being ceramic material.

The invention provides means for urging tape 12 into constant engagement with fixed edge member 28. To achieve this result a movable edge member 34 is utilized. The movable edge member 34 is planar, of a wear-resistant material such as ceramic, and may be, as illustrated, of a similar geometric configuration to the fixed edge member 28. The movable edge member 34 is supported in a plane substantially parallel the fixed edge member 28, and in a manner so that it is movable towards and away from the fixed edge member. In addition, movable edge member 34 is nonrotatable about the guide block 26, that is, it is not deflectible in either direction parallel base plate 14 by motion of tape 12. Further, the movable edge member 34 is resiliently urged in a direction toward the fixed edge member 28.

Movable edge member 34 includes an opening 34A loosely receiving the reduced diameter shoulder portion 26B of the guide block 26. The movable edge member 34 includes an outer planar tape contacting surface 34B and a parallel inner surface 34C. Movable edge member 34 is supported to a flexible support member 36, that is, the inner surface 34C is secured, such as by bonding by means of epoxy adhesive, to the surface of a planar flexible support member 36. The flexible support member 36 has an opening 36A therein corresponding to the opening 34A in the movable edge member to receive the guide block shoulder portion 26B.

The flexible support member 36 is formed of a high strength flexible material, such as spring steel, and includes a tongue portion 36B integrally extending beyond the extremity of the movable edge member 34. The tongue portion 36B is affixed, at its outer end, to the baseplate 14 by means of a screw 38.

Movable edge member 34 affixed to the flexible support member 36 is thus able to easily deflect, by means of the tongue portion 36B, towards and away from fixed edge member 28 while at the same time it is nonrotatable about the guide block 26 and therefore nondeflectible in the direction of movement of tape 12.

Spaced from threaded opening 18 in baseplate 14 is a second opening 40. The part of opening 40 opposite the side receiving the guide block 26 is threaded and receives a threaded set screw 42. Received in opening 40 between the setscrew 42 and the flexible support member 36 is a coiled spring 44 which, being under compression, resiliently urges the movable edge member 34 towards the fixed edge member 28.

As best seen in FIG. 5, the guide block 26 includes an increased radius segmental portion 26C which forms an arcuate surface contacted by tape 12 passing over the tape guide. As seen in FIG. 3 the increased radius segmental portion 26C extends beyond the inner end 26D of the guide block and is parallel to the shoulder portion 26B. The inner end 26E of the extending segmental portion 26C is contacted by the outer surface 34B of the movable edge member 34 when no tape is positioned on the tape guide. The total length of the increased radius segmental portion 28C is slightly less than the minimum industrially accepted width of the tape for which the tape guide is designed so that with tape in position on the guide the movable edge member 34 always is in contact with the tape urging it in the direction towards the fixed edge member 28.

The provision of the increased radius segmental portion 28C and particularly the extending portion terminating in end 28E provides areas in which dirt, lint and so forth scraped off tape passing over the tape guide, may collect so as to afford the least chance for the collection of such foreign material to interfere with the operation of the tape guide.

The tape guide as herein described achieves the objects set forth at the beginning of the description by providing an improved means of resiliently urging tape into contact with a fixed reference edge. The device described provides a movable edge member which is not deflected in the direction of movement of the tape but is resiliently deflected in the direction towards the fixed edge member.

The invention has been described with a certain degree of particularity but is manifest that many changes may be made in the details of construction and the arrangement of components without departing from the spirit and scope of this disclosure. It is understood that the invention is not to be limited by the embodiment illustrated herein, but is to be limited only by the scope of the attached claim or claims, including the full range of equivalency to which each element is entitled.

I claim:

1. A tape guide comprising:

a baseplate;

a guide block affixed at its inner end to said baseplate and extending perpendicularly from said baseplate, said guide block having an arcuate surface over which tape passes;

a fixed planar edge member supported to the guide block at the outer end thereof, said fixed edge member providing a fixed reference edge engaged by one edge of tape passing over said guide block;

a movable planar edge member pivotally supported to said baseplate having an opening therein receiving said guide block, said edge member including a flat, thin, flexible portion affixed to its outer end to said baseplate, said flexible portion permitting said edge member to flex in the direction towards and away from said fixed edge member and preventing movement in the direction parallel said baseplate; and adjustable resilient means engaging said baseplate urging said movable edge member towards said fixed edge member.

2. A tape guide according to claim 1, wherein said guide block includes an integral reduced dimensional shoulder portion at the inner end thereof engaging said baseplate, said shoulder portion being received by said opening in said movable edge member, the length of said shoulder portion being greater than the thickness of said movable edge member permitting said movable edge member to move towards and away from said outer edge member.

3. A tape guide member according to claim 2, wherein said guide block is cylindrical having inner and outer ends, and including an integral increased radius cylindrical segmental portion forming said arcuate surface over which tape passes, said increased radius cylindrical segmental portion extending beyond the inner end of said guide block and parallel to and spaced from said shoulder portion and of a length less than said shoulder portion, said movable edge member being positioned between said extending segmental portion and said baseplate.

4. A tape guide according to claim 1, wherein said baseplate includes a threaded opening therethrough adjacent said guide block and including:

a setscrew received in said threaded opening, said spring being positioned in said threaded opening and between said setscrew and said movable edge member, the threadable positioning of said setscrew serving to vary the resilient force applied to said movable edge member.

* * * * *